United States Patent [19]

Dudek et al.

[11] Patent Number: 5,270,935

[45] Date of Patent: Dec. 14, 1993

[54] ENGINE WITH PREDICTION/ESTIMATION AIR FLOW DETERMINATION

[75] Inventors: Kenneth P. Dudek, Rochester Hills; Vincent A. White, Northville, both of Mich.

[73] Assignee: General Motors Corporation, Detroit, Mich.

[21] Appl. No.: 653,931

[22] Filed: Feb. 12, 1991

Related U.S. Application Data

[63] Continuation-in-part of Ser. No. 618,122, Nov. 26, 1990, abandoned.

[51] Int. Cl.$^5$ .................. G06F 15/48; G06F 15/50; G06F 7/70; F02M 51/00
[52] U.S. Cl. .................. 364/431.01; 364/431.04; 364/431.05; 123/480; 123/494; 123/488; 123/419; 73/117.3; 73/118.2
[58] Field of Search ............. 364/431.04, 431.05, 364/510, 431.07, 149, 148, 550; 123/480, 478, 188.14, 488, 445, 676, 306, 494, 571, 569, 438; 73/117.3, 861.52, 118.2

[56] References Cited

U.S. PATENT DOCUMENTS

| | | | |
|---|---|---|---|
| 4,269,156 | 5/1981 | Drellishak | 123/478 |
| 4,386,520 | 6/1983 | Nagaishi | 73/118 |
| 4,433,666 | 2/1984 | Masaki et al. | 123/569 |
| 4,437,340 | 3/1984 | Csere et al. | 73/118 |
| 4,438,497 | 3/1984 | Willis et al. | 364/431.05 |
| 4,446,523 | 5/1984 | Reinke | 364/431.05 |
| 4,495,921 | 1/1985 | Sawamoto | 123/438 |
| 4,502,325 | 3/1985 | Klomp | 73/118 |
| 4,548,185 | 10/1985 | Pozniak | 123/571 |
| 4,599,694 | 7/1986 | Aposcanski et al. | 364/431.05 |
| 4,644,474 | 2/1987 | Aposchanski et al. | 364/431.05 |
| 4,664,090 | 5/1987 | Kabasin | 123/494 |
| 4,750,352 | 6/1988 | Kolhoff | 73/117.3 |
| 4,761,994 | 8/1988 | Sogawa | 73/118.2 |
| 4,860,222 | 8/1989 | Schmidt et al. | 364/550 |
| 4,893,244 | 1/1990 | Tang et al. | 364/431.03 |
| 4,969,439 | 11/1990 | Scotson | 123/419 |
| 4,986,243 | 1/1991 | Weissler, II et al. | 123/488 |
| 4,987,888 | 1/1991 | Funabashi et al. | 123/488 |
| 5,051,909 | 9/1991 | Gomez et al. | 364/431.05 |

FOREIGN PATENT DOCUMENTS

3416812 11/1985 Fed. Rep. of Germany.
3432757 3/1986 Fed. Rep. of Germany.

OTHER PUBLICATIONS

Automotive Engine Control: A Linear Quadratic Approach by James Brian Lewis Jul., 1980.
"State Functions and Linear Control Systems", 1967, McGraw-Hill, Inc., USA.
"Probability, Random Variables, and Stochastic Processs", 1965, McGraw-Hill, Inc., U.S.A.

Primary Examiner—Thomas G. Black
Assistant Examiner—Jacques H. Louis-Jacques
Attorney, Agent, or Firm—Anthony Luke Simon

[57] ABSTRACT

A method for accurately determining the measure of mass airflow into an internal combustion engine determines measures of various engine parameters and implements the mathematical modeling technique of prediction and estimation.

6 Claims, 3 Drawing Sheets

ENGINE WITH PREDICTION/ESTIMATION AIR FLOW DETERMINATION

This application is a continuation-in-part of U.S. Ser. No. 07/618,122, filed on Nov. 26, 1990, assigned to the assignee of this application, and abandoned with the filing of this application.

This invention relates to a method for measuring mass airflow into an engine and more particularly for predicting mass airflow based on measures of various engine parameters and a mathematical model. The subject of this application is related to copending patent applications U.S. Ser. No. 07/653,923, now U.S. Pat. No. 5,070,846, entitled "Method for Estimating and Correcting Bias Errors in a Software Air Meter", and 07/653,922, now abandoned, entitled "Method for Predicting R-Step Ahead Engine State Measurements", both filed concurrently with this application and assigned to the assignee of this application. The disclosures of patent applications Ser. No. 07/653,923 and 07/653,922 are hereby incorporated into this application by reference.

BACKGROUND OF THE INVENTION

The air-fuel ratio in a combustion engine affects both engine emissions and performance. With strict modern emissions standards for automobiles, it is necessary to control accurately the air-fuel ratio of the automobile engine, requiring precise measurement of the mass airflow into the engine.

Currently, engine airflow is either measured with a mass airflow sensor or calculated by the speed-density method. In general, while mass airflow sensors are more accurate than speed-density systems, they are also more expensive.

What is desired is an airflow measurement system that eliminates the expensive airflow sensors of current fast response systems while offering the same improved air-fuel ratio control, easy calibration and adaptability to changing conditions.

SUMMARY OF THE PRESENT INVENTION

The present invention is a method of dynamically determining the airflow into an internal combustion engine using a mathematical model of the engine. The invention implements the technique of prediction and estimation to determine mass airflow into the engine. The prediction-estimation technique is a two step process: (1) model-based prediction, and (2) measurement-based correction (estimation). In the prediction step, mathematical model parameters, past and present measures of various engine parameters, and previous estimations of mass airflow and manifold pressure are used to determine current predictions of two engine parameters, one measured and one not measured. Manifold pressure is the measured quantity and mass airflow is the non-measured quantity. In the estimation, or measurement-based correction step, the error in the prediction of the measured quantity, here manifold pressure, is used in combination with a set of estimator correction coefficients to determine an estimated manifold pressure and an estimated mass airflow into the engine. The method is iteratively executed by a computer-based controller, and the estimated mass airflow is used to schedule engine fuel delivery.

The model parameters may be determined through statistical reduction of data taken from a test vehicle that employs a mass airflow sensor. The estimator error coefficients are preferably determined through statistical optimization.

The engine parameters measured and used in prediction-estimation are manifold pressure, engine speed, air temperature, and throttle position. In the preferred implementation, parameters such as atmospheric pressure and, where present in the engine, the exhaust gas recirculation valve position and idle air control valve position are taken into account.

Use of the present invention allows precise air-fuel ratio control comparable to that achieved via fast response airflow meters while offering reduced costs through elimination of the expensive airflow sensor.

DETAILED DESCRIPTION OF THE INVENTION

Figure 1:
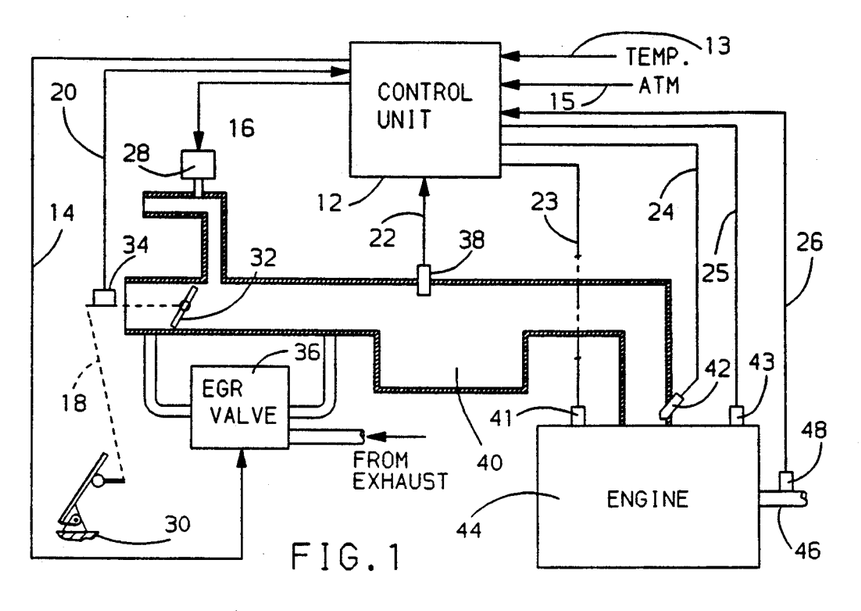
FIG. 1 is a schematic diagram showing an engine assembly, sensors, and control unit in which the invention may be implemented.

Referring to FIG. 1 the engine assembly shown includes the engine 44, fuel injectors 42, spark plugs 41 and 43, air intake manifold 40, throttle 32, exhaust gas recirculation (EGR) valve 36, and idle air control (IAC) valve 28. The throttle is controlled by accelerator pedal 30 as shown by dotted line 18 and the IAC valve 28, EGR valve 36, spark plugs 41 and 43, and fuel injectors 42 are controlled by controller 12 through lines 16, 14, 23, 25 and 24. Air temperature and atmospheric pressure are sensed by sensors (not shown) and input into the controller 12 through lines 13 and 15. The positions of the IAC valve 28 and the EGR valve 36 are determined from the commands on command lines 14 and 16, or they may be measured directly using position sensors (not shown). The throttle position and manifold pressure are sensed by sensors 34 and 38 and input into the control unit 12 through lines 20 and 22. Engine speed is measured through the sensor 48, which detects the rotations of output shaft 46, and input into the control unit 12 through line 26. The sensors mentioned above are all standard sensors, a variety of which are readily available to those skilled in the art.

The control unit 12 is a standard control unit easily implemented by one skilled in the art and preferably includes a microcomputer that runs a computer program implementing the present invention together with the standard engine control functions. The computer program may be stored in ROM. The control unit should also include RAM for storage of data including computed variables and measurements of various engine parameters. The control unit also includes an input/output unit and standard interfaces to the different sensors and valves.

In the implementation of the invention, the control unit determines the measures of the engine parameters including EGR valve position, IAC valve position, manifold pressure, engine speed, temperature, and atmospheric pressure and uses the measurements in the prediction-estimation process to determine an accurate measure of the mass airflow into the engine. Once an accurate measure of the mass airflow into the engine is determined, the fuel injectors 42 can be controlled through lines 24 so that a proper air fuel ratio enters the engine 44. The mass airflow into the engine can also be used together with other engine parameters to determine the ignition timing for spark plugs 41 and 43.

Many engines do not have an IAC valve 28 or an EGR valve 36, but as will be explained below, their presence is not necessary for the successful implementation of the invention. Furthermore, the atmospheric pressure need not be determined for successful implementation of the invention. Taking atmospheric pressure into account, however, will increase the accuracy of the computed mass airflow measurement.

Figure 2:
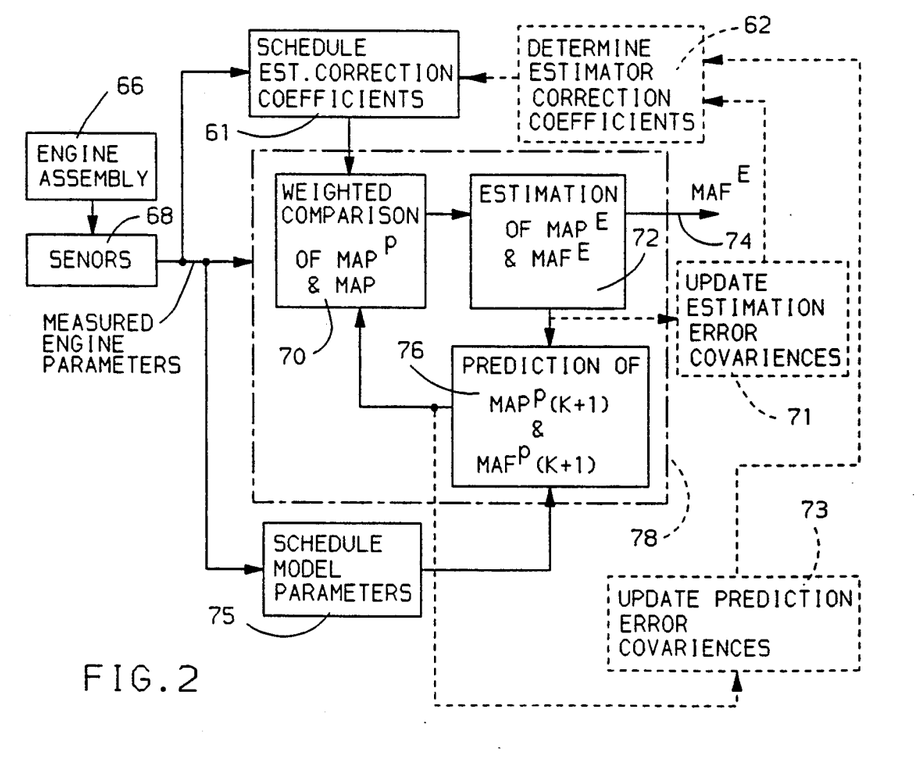
FIG. 2 is a schematic diagram showing the prediction-estimation method implemented by the present invention.

Implementation of prediction-estimation mathematical modeling to calculate mass airflow into the engine can be further explained with reference to FIG. 2. Block 66 represents the engine assembly whose parameters are measured by sensors 68 and used by the predictor-estimator 78. As can be seen by the arrangement of blocks 70, 72, and 76, the prediction-estimation method operates in a loop.

As will be explained, the prediction-estimation method is a dynamic process whose output depends upon previous measurements and estimations. For this reason, various parameters of the system must be initialized, during vehicle start-up or system reset. After initialization, estimations of mass airflow and manifold pressure are computed through blocks 70 and 72 in response to previously predicted manifold pressures and mass airflows and a weighted comparison of a previously predicted manifold pressure and the actual measured manifold pressure. New predictions of manifold pressure and mass airflow are determined at block 76 in response to the estimates at block 72, the measured engine parameters, and a set of model parameters. The coefficients used in the weighted comparison in block 70 are preferably predetermined in block 62 in a test vehicle through a statistical optimization process such as Kalman filtering and scheduled, based upon two independent engine parameters, at block 61. The model parameters are predetermined through statistical reduction of data taken from a test vehicle and scheduled at box 75.

For purposes of further clarification, initialization and operation of a basic system implementing the present invention will be described in the first example:

EXAMPLE 1

For a basic implementation of the invention, the time function variables used are throttle position (TPS(k−f)), predicted manifold pressure (MAP$^p$(k−f)), and predicted mass airflow into the engine (MAF$^p$(k−f), where k is the current time event and f is an integer at least zero. To simplify explanation, vector notation is used. Vector P(k) represents previous measurements of throttle position and vector X$^p$(k) represents previous predictions of manifold pressure and mass airflow into the engine, e.g., $$P(k) = \begin{pmatrix} TPS(k-1) \\ . \\ . \\ . \\ TPS(k-e) \end{pmatrix}, \text{ and } X^p(K) =$$

$$\begin{pmatrix} MAF^p(k-j) \\ MAF^p(k-j+1) \\ . \\ . \\ . \\ MAF^p(k) \\ MAF^p(k-i) \\ MAF^p(k-i+1) \\ . \\ . \\ . \\ MAF^p(k) \end{pmatrix},$$

where e, j, and i are predetermined integers which are system constants, and k is the current time event. During initialization, the vectors P(k) and X$^p$(k) are given values of throttle positions, predicted manifold pressures, and predicted mass airflows typically found during engine idle. These values can be stored in a system ROM.

The system then enters the prediction-estimation loop where it first measures the present engine parameters, here: throttle position, TPS(k), engine speed, RPM(k), manifold pressure, MAP(k), and temperature, T(k), block 68. The past and present measures of engine parameters can be expressed as a vector U(k), e.g., $$U(k) = \begin{pmatrix} TPS(k) \\ P(k) \\ RPM(k) \\ T(k) \end{pmatrix}.$$

The set of estimator correction coefficients is then retrieved from ROM or RAM depending upon the implementation of the system. As will be explained below, the estimator correction coefficients are preferably predetermined. If the estimator correction coefficients are predetermined, they can be scheduled at block 61, e.g., found from a three dimensional look-up table in ROM based upon two independent engine parameters, preferably engine speed and manifold pressure. A detailed description of the determination of the correction coefficients will be set forth further below.

The estimator error coefficients may be represented by a vector G, e.g., $$G = \begin{pmatrix} G_{1,j} \\ G_{1,j-1} \\ \vdots \\ G_{1,0} \\ G_{2,i} \\ G_{2,i-1} \\ \vdots \\ G_{2,0} \end{pmatrix}$$

Implementation of statistical optimization of the estimator correction coefficients reveals that the coefficients G for a given engine operating point eventually achieve a virtual steady state. This allows the determination of G to be done off line, e.g., in a test vehicle, and the values for G to be programmed into ROM in the control unit. This method is strongly preferred because the matrix equations required by block 62 become very extensive if many variables are used in the model, requiring more computer execution time than would normally be available in an automotive engine controller. As an alternative, however, the statistical optimization process described below may be programmed into the control unit 12 and the values for G can be continuously updated during operation of the engine and stored in RAM.

Referring again to FIG. 2, after the estimator correction coefficients comprising vector G are retrieved, they are used at block 70 in the weighted comparison of predicted manifold pressure, $MAP^p(k)$, and measured manifold pressure, $MAP(k)$. The weighted comparison may be done either as a separate step from determining the estimations or as part of the estimation determination step. The weighted comparisons can be described as the following functions:

$$G_{1,j}(MAP(k) - MAP^p(k)); \text{ and}$$

$$G_{2,j}(MAP(k) - MAP^p(k)).$$

The estimations of manifold pressure and mass airflow into the engine, $MAP^e(k-f)$ and $MAF^e(k-f)$, may be described in vector notation by a vector $X^e(k)$, e.g., $$X^e(K) = \begin{pmatrix} MAP^e(k - j) \\ MAP^e(k - j + 1) \\ \vdots \\ MAP^e(k) \\ MAF^e(k - i) \\ MAF^e(k - i + 1) \\ \vdots \\ MAF^e(k) \end{pmatrix}$$

Boxes 70 and 72 define vector $X^e(k)$ according to the following vector equation:

$$X^e(k) = X^p(k) + G(MAP(k) - MAP^p(k)),$$

which is equivalent to the series of equations:

$MAP^e(k - j) = MAP^p(k - j) + G_{1,j}(MAP(k) - MAP^p(k)),$ $MAP^e(k - j + 1) = MAP^p(k - j + 1) + G_{1,j-1}(MAP(k) - MAP^p(k)),$

...

$MAP^e(k) = MAP^p(k) + G_{1,0}(MAP(k) - MAP^p(k)),$ $MAF^e(k - i) = MAF^p(k - i) + G_{2,i}(MAP(k) - MAP^p(k)),$ $MAF^e(k - i + 1) = MAF^p(k - i + 1) + G_{2,i-1}(MAP(k) - MAP^p(k)),$

...

$MAF^e(k) = MAF^p(k) + G_{2,0}(MAP(k) - MAP^p(k)).$

The estimated mass airflow, $MAF^e(k)$, on line 74 is used as an accurate measure of the mass airflow into the engine.

The model parameters used in the prediction step may be described as five different sets of parameters, $\{a_1, a_2, \ldots a_{j++2}\}$, $\{b_1, b_2, \ldots b_{j+i+2}\}$, $\{c_1, c_2, \ldots c_{e+3}\}$, $\{d_1, d_2, \ldots d_{e+3}\}$, and $\{h_1, h_2\}$, and define matrices A, B, and C as follows:

$$A = \begin{pmatrix} 0 & 1 & 0 & \cdots & 0 & 0 & 0 & \cdots \\ 0 & 0 & 1 & 0 \cdots & 0 & \cdot & 0 & \cdots \\ \cdot & \cdot & 0 & \cdot & \cdot & \cdot & \cdot & \cdots \\ \cdot & \cdot & \cdot & \cdot & \cdot & \cdot & \cdot & \cdots \\ \cdot & \cdot & \cdot & \cdot & 0 & \cdot & \cdot & \cdots \\ \cdot & 0 & \cdot & 0 & 1 & 0 & 0 & 0 \cdots 0 \\ a_1 a_2 & \cdots & a_j & a_{j+1} & a_{j+2} & a_{j+3} & \cdots & a_{j+i+2} \end{pmatrix} \begin{matrix} (1) \\ (2) \\ \\ \\ \\ \\ (j+1) \end{matrix}$$

$$\begin{pmatrix} 0 & 1 & 0 & \cdots & 0 & 0 & 0 & \cdots \\ 0 & 0 & 1 & 0 \cdots & 0 & \cdot & 0 & \cdots \\ \cdot & \cdot & 0 & \cdot & \cdot & \cdot & \cdot & \cdots \\ \cdot & \cdot & \cdot & \cdot & \cdot & \cdot & \cdot & \cdots \\ \cdot & \cdot & \cdot & \cdot & 0 & \cdot & \cdot & \cdots \\ \cdot & 0 & \cdot & 0 & 1 & 0 & 0 & 0 \cdots 0 \\ b_1 b_2 & \cdots & b_j & b_{j+1} & b_{j+2} & b_{j+3} & \cdots & b_{j+i+2} \end{pmatrix} \begin{matrix} (j+2) \\ \\ \\ \\ \\ \\ (j+i+2) \end{matrix}$$

$$B = \begin{pmatrix} 0 & \cdots & 0 \\ \cdot & & \cdot \\ \cdot & & \cdot \\ 0 & & 0 \\ c_1 & \cdots & c_{e+3} \end{pmatrix} \begin{matrix} (1) \\ (2) \\ \\ \\ (j+1) \end{matrix}, \text{ and } c = \begin{pmatrix} 0 \\ \cdot \\ \cdot \\ 0 \\ h_1 \end{pmatrix}.$$

-continued $$\begin{pmatrix} 0 \ldots 0 & (1) & 0 \\ \cdot & (2) & \cdot \\ \cdot & \cdot & \cdot \\ \cdot & \cdot & \cdot \\ 0 & 0 & \cdot \\ c_1 \ldots c_{e+3} & (j+i+2) & 0 \\ & & h_2 \end{pmatrix}$$

These sets of model parameters are found through statistical regression of data taken from a test vehicle with an independent mass airflow meter to measure actual mass airflow, MAF. The parameters $\{a_1, A_2, \ldots a_{j+i+2}\}$, $\{c_1, c_2, \ldots c_{e+3}\}$, and $h_1$ are the gain coefficients for finding $MAP^p$ and the parameters $\{b_1, n_2, \ldots b_{j+i+2}\}$, $\{d_1, d_2, \ldots d_{e+3}\}$, and $h_2$ are the gain coefficients for finding $MAF^p$.

The statistical regression process includes running the test vehicle in various states to obtain sets of engine parameter data and actual mass airflow measurements for each time event k. Optimization problems are then set up to find the model parameters ($a_{fs}$, $b_{fs}$, $c_{fs}$, $d_{fs}$, and $h_{fs}$) for each engine state to minimize the following functions:

$$\sum_{l=1}^{n-1} [w_1(l)(MAP(l+1) - MAP^M(l+1))]^2,$$

and $$\sum_{l=1}^{n-1} [w_2(l)(MAF(l+1) - MAF^M(l+1))]^2,$$

where n is the number of data observations for the specific engine state, $w_1(l)$ and $w_2(l)$ are positive weighting constants chosen to improve model fit in critical areas and to ensure statistical integrity of the model and may vary as a function of l, and where:

$MAP^M(l+1) = a_1MAP(l-j) + a_2MAP(l-j+1) + \ldots +$ $a_{j+1}MAP(l) + a_{j+2}MAF(l-i) + a_{j+3}MAF(l-i+1) + \ldots +$ $a_{j+i+2}MAF(l) + c_1TPS(l) + c_2TPS(l-1) + \ldots$ $c_{e+2}RPM(l) + c_{e+3}T(l) + h_1$, and $MAP^M(l+1) = a_1MAP(l-j) + a_2MAP(l-j+1) + \ldots +$ $a_{j+1}MAP(l) + a_{j+2}MAF(l-i) + a_{j+3}MAF(l-i+1) + \ldots +$ $a_{j+i+2}MAF(l) + c_1TPS(l) + c_2TPS(l-1) + \ldots$ $c_{e+2}RPM(l) + c_{e+3}T(l) + h_2$.

One skilled in the art can easily perform the above statistical regression and determine the model parameters, therefore the determination of the model parameters will not be set forth in further detail here.

Internal combustion engines are typically nonlinear and the prediction step set forth below is a linear function with different sets of model parameters to approximate the engine at different operating points. The model parameters should therefore be scheduled for accurate predictions. Likewise, as mentioned above, the estimator corrections coefficients, G, should be scheduled. The scheduling may be done with reference to any two independent engine parameters, preferably engine speed, RPM(k), and manifold pressure, MAP(k).

The scheduling of the model parameters may be done several different ways. One scheduling method is to use single schedules of parameters and estimator correction coefficients over defined (RPM, MAP) ranges. Another scheduling method is to determine the parameters and estimator correction coefficients at different (RPM, MAP) engine operating points and to interpolate between the determined parameters to find a different set of parameters and estimator correction coefficients for each (RPM, MAP) engine operating point. With either of these scheduling methods, the parameters may be retrieved from a three dimensional look-up table in computer memory based on engine speed and manifold pressure, or any other two independent engine parameters. Additionally, any other suitable scheduling method may be used.

After the model parameters are retrieved, at block 75, the predicted manifold pressures and mass airflows for the next time event, comprising the vector $X^p(k+1)$, are determined at block 76 according to the following vector equation:

$$X^p(k+1) = AX^e(k) + BU(k) + C,$$

which is equivalent to the group of equations:

$MAP^p(k-j+1) = MAP^e(k-j+1),$ $MAP^p(k-j+2) = MAP^e(k-j+2),$

.
.
.

$MAP^p(k) = MAP^e(k),$
$MAP^p(k+1) = a_1MAP^e(k-1) + a_2MAP^e(k-j+1) + \ldots +$
$a_{j+1}MAP^e(k) +$
$a_{j+2}MAF^e(k-i) + a_{j+3}MAF^e(k-i+1) + \ldots +$
$a_{j+i+2}MAF^e(k) +$
$c_1TPS(k) + c_2TPS(k-1) + \ldots +$
$c_{e+2}RPM(k) + c_{e+3}T(k) + h_1,$ $MAF^p(k-i+1) = MAF^e(k-i+1),$
$MAF^p(k-i+2) = MAF^e(k-i+2),$

.
.
.

$MAF^p(k) = MAF^e(k),$
$MAF^p(k+1) = b_1MAP^e(k-j) + b_2MAP^e(k-j+1) + \ldots +$
$b_{j+1}MAP^e(k) + b_{j+2}MAF^e(k-i) +$
$b_{j+3}MAF^e(k-i+1) + \ldots +$
$b_{j+i+2}MAF^e(k) + d_1TPS(k) +$
$d_2TPS(k-1) + \ldots + d_{e+2}RPM(k) + d_{e+3}T(k) + h_2.$ After the $X^p(k+1)$ is determined, the engine parameters for the next time event are measured and a new estimate is made at blocks 70 and 72. The system then repeats the steps of estimation and prediction in a loop.

Blocks 62, 71, and 73 represent one method of how the estimator correction coefficients G may be predetermined, or updated during implementation of the above described model, Kalman filtering. For purposes of explanation, the determination of G will be set forth in an example where G is predetermined, as in a test vehicle.

After the model parameters are found, the invention is implemented in a control system in the test vehicle in a similar manner as explained above. The difference is that blocks 62, 71, and 73 are added to the control routine for computing the estimator correction coefficients, which are now a function of time and will be represented by the vector G(k) where:

$$G(k) = \begin{pmatrix} G_{1,j}(k) \\ G_{1,j-1}(k) \\ \cdot \\ \cdot \\ \cdot \\ G_{1,0}(k) \\ G_{2,i}(k) \\ G_{2,i-1}(k) \\ \cdot \\ \cdot \\ \cdot \\ G_{2,0}(k) \end{pmatrix}$$

After each estimation, the estimation error covariances (error variances dependent upon multiple variables) are updated at block 71 and after each prediction, the prediction error covariances are updated at block 73. Based upon the estimation and prediction error covariances, the correction coefficients are updated at block 62. The correction coefficients are then sorted into schedules based upon two independent engine parameters.

More particularly, during initialization of the system, variables representing the MAP measurement error variance, $\gamma$, and the process noise covariance, Q, are input into the controller. One example for the matrix Q is:

$$Q = \begin{pmatrix} q_1 & 0 & \ldots & & 0 \\ 0 & q_2 & & & \cdot \\ \cdot & 0 & \cdot & & \cdot \\ \cdot & & \cdot & \cdot & \cdot \\ \cdot & & & \cdot & 0 \\ 0 & 0 & \ldots & 0 & q_{j+i+2} \end{pmatrix},$$

where $q_1 = q_2 = \ldots = q_{j+1} =$ [error variance of the MAP model computed in the above mentioned statistical reduction of data used to determine the model parameters], and $q_{j+1} = q_{j+2} = q_{j+i+2} =$ [error variance of the MAF model computed in the above mentioned statistical reduction of data used to determine the model parameters]. In general, Q may be any positive semi-definite matrix.

At block 62, G(k) is computed according to the equation:

$$G(k) = Z(k)LT/(LZ(k)L^T + \gamma),$$

where z(k) is the state prediction error covariance at time k, L a matrix such that:

$$L = [0 \ldots 0 \ 1 \ 0 \ldots 0],$$

with the "1" in the (j+1)st position, and $L^T$ is the transpose of L (a column matrix with all zeros except for a "1" in the (j+1)st position). At block 72, $X^e(k)$ is computed using G(k), such that:

$$X^e(k) = X^p(k) + G(k)(MAP^p(k) - MAP^p(k)).$$

At block 71, the state estimator error covariance S(k) is updated where:

$$S(k) = (1 - G(k)L)Z(k),$$

where I is the following identity matrix:

$$I = \begin{pmatrix} 1 & 0 & \ldots & & 0 \\ 0 & 1 & & & \cdot \\ \cdot & & \cdot & & \cdot \\ \cdot & & & \cdot & \cdot \\ \cdot & & & & 0 \\ 0 & \ldots & & 0 & 1 \end{pmatrix} \begin{matrix} (1) \\ (2) \\ \cdot \\ \cdot \\ \cdot \\ (j+i+2) \end{matrix}$$

The prediction step at box 76, where $X^p(k+1)$ is computed is the same as explained above. At block 73, the state prediction error covariance Z(k) is updated such that:

$$Z(k+1) = AS(k)A^T + Q,$$

where $A^T$ is the transpose of A.

Running the test vehicle in an engine operating range around a particular engine operating point for several seconds, e.g., 1000 cycles, will result in stabilization of vector G(k) for that particular engine operating range. The vector G for that particular engine operating range can then be set equal to G(k), where k = 1000.

Kalman filtering is only one method of determining G. Any group of constants which tend to lessen the error in the estimates can be chosen for G. The limitation for the system is that the roots of the polynomial f(z), described below, must be within the unit circle. The polynomial f(z) is the determinant of a matrix M, defined as:

$$M = zI - A + GLA.$$

The above described example is a general case where TPS is considered over the past (e) time events, $MAP^p$ is considered over the past (j) time events, and $MAF^p$ is considered over the past (i) time events. If (e), (j), and (i) are large, then the calculations become quite complicated. Balancing considerations of simplicity and system accuracy, the preferred implementation sets these variables as follows: e = 3, j = 1, and i = 0. It should be noted that any of the engine parameters may be treated as time function variables, in other words, the present and past values of any of the engine parameters may be used, but the balance between simplicity and accuracy favors the specific implementations set forth herein.

EXAMPLE 2

Many automobile engines have exhaust gas recirculation (EGR) valves and/or idle air control (IAC) valves. If one or both of these valves are present in the vehicle, it is preferred that the mathematical model take these parameters into account. In these cases, when the other engine parameters, such as TPS(k), RPM(k), and T(k) are measured, the valve positions, EGR(k) and IAC(k), are measured (e.g., through detection of the valve position commands) and included in the vector U(k). Additionally, the model parameters include gain factors $c_f$, $c_{f+1}$, $d_f$ and $d_{f+1}$ which are included in matrix B and are multiplied by the valve position measurements, EGR(k-

)and IAC(k), in the calculation of the model predictions $X^p(k+1)$.

EXAMPLE 3

Another parameter that is preferably taken into account to increase the accuracy of the estimations is atmospheric pressure, ATM(k−f). Past measurements of this parameter can be considered to increase accuracy and included as part of P(k) and U(k), where:

$$U(k) = \begin{pmatrix} TPS(k) \\ TPS(k-1) \\ . \\ . \\ . \\ TPS(k-e) \\ RPM(k) \\ IAC(k) \\ EGR(k) \\ T(k) \\ ATM(k) \\ ATM(k-1) \\ . \\ . \\ . \\ ATM(k-g) \end{pmatrix}$$

where g is a system constant. The atmospheric pressure is measured when the other engine parameters are measured. Additionally, the model parameters include gain factors $c_f \ldots c_{f+g+1}$ and $d_f \ldots d_{f+g+1}$ which are included in matrix B and are multiplied by the measurements of atmospheric pressure, ATM(k−f), in the calculation of the model predictions $X^p(k+1)$. The atmospheric pressure ATM(k) may be measured directly with a pressure sensor, or indirectly using the manifold pressure sensor 38 in FIG. 1. The manifold pressure sensor can measure approximate atmospheric pressure at key on, before the engine starts, and at wide open throttle.

Figure 3:
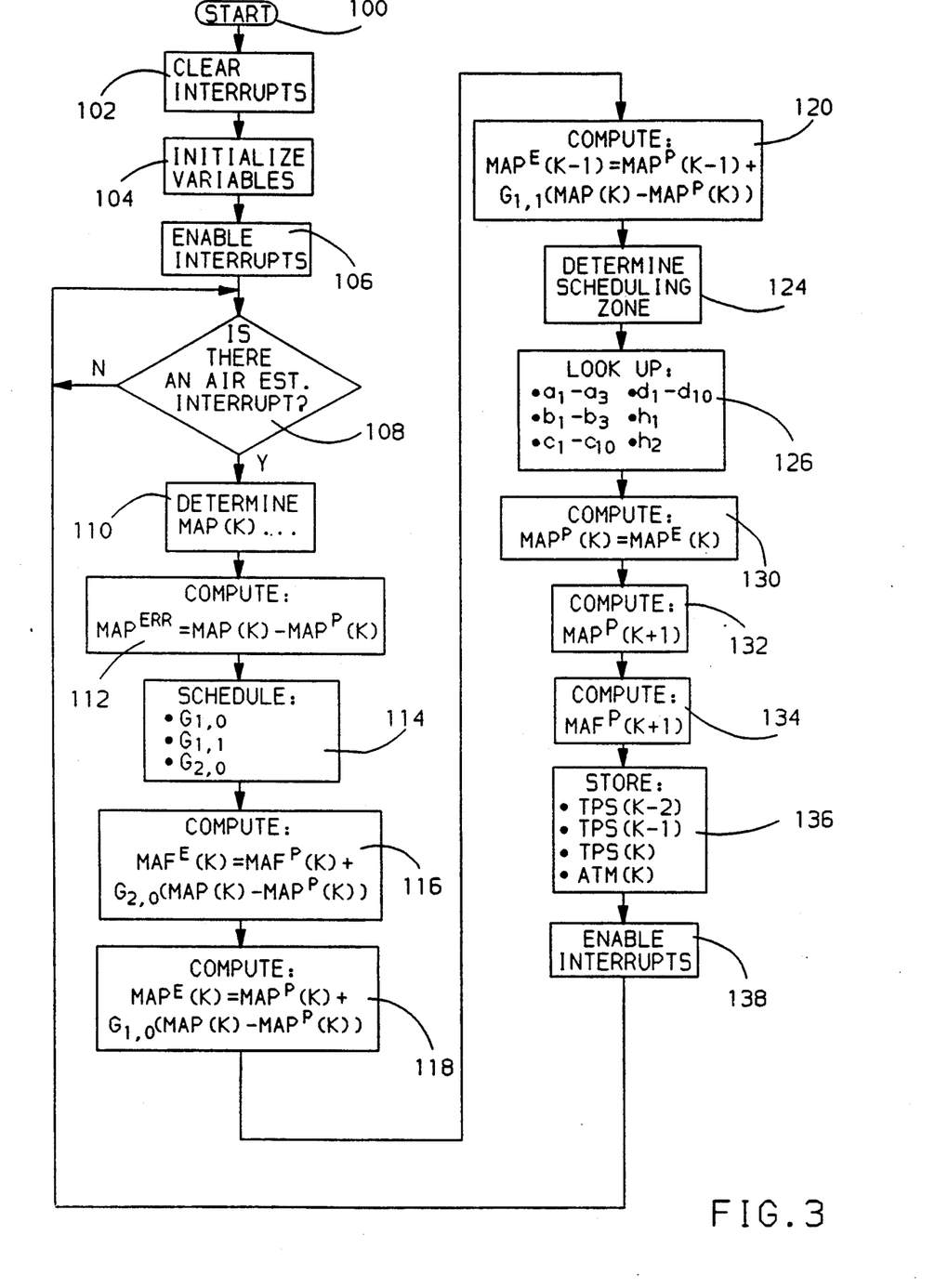
FIG. 3 is a control diagram for a computer implementation of the present invention.

FIG. 3 represents a computer flow diagram of the preferred implementation of the invention. This implementation takes into account atmospheric pressure and the IAC and EGR valves and sets: e=3, j=1, i=0, and g=1.

Steps 100, 102, 104, and 106 startup the system and initialize the variables. At step 108, the system checks for an interrupt signal, which is produced by the engine controller whenever it requires a new mass airflow estimate. If there is an interrupt, the program proceeds into the prediction-estimation loop starting at box 110, where the engine parameters MAP(k), RPM(k), TPS(k), IAC(k), EGR(k), T(k), and ATM(k) are determined. At step 112, the computer computes a value for manifold pressure error, $MAP^{err}$, where $MAP^{err} = MAP(k) - MAP^p(k)$. At step 114 the estimator correction coefficients are scheduled and retrieved.

At steps 116, 118, and 120, $MAF^e(k)$, $MAP^e(k)$, and $MAP^e(k-1)$ are computed. The computer determines the model parameter schedule zone utilizing RPM(k) and MAP(k) at step 124. At step 126, the computer looks up the model parameters from ROM memory.

$MAP^p(k)$ is computed at step 130 such that $MAP^p(k) = MAP^e(k)$ and, at step 132, $MAP^p(k+1)$ is computed according to the equation:

$$MAP^p(k+1) = a_1 MAP^e(k-1) + a_2 MAP^e(k) +$$
$$a_3 MAF^e(k) + c_1 TPS(k) + c_2 TPS(k-1) + c_3 TPS(k-2) +$$
$$c_4 TPS(k-3) + c_5 RPM(k) + c_6 IAC(k) + c_7 EGR(k) +$$
$$c_8 T(k) + c_9 ATM(k) + c_{10} ATM(k-1) + h_1.$$

At step 134, $MAF^p(k+1)$ is computed according to the equation:

$$MAF^p(k+1) = a_1 MAP^e(k-1) + a_2 MAP^e(k) +$$
$$a_3 MAF^e(k) + c_1 TPS(k) + c_2 TPS(k-1) + c_3 TPS(k-2) +$$
$$c_4 TPS(k-3) + c_5 RPM(k) + c_6 IAC(k) + c_7 EGR(k) +$$
$$c_8 T(k) + c_9 ATM(k) + c_{10} ATM(k-1) + h_2.$$

At step 136, the computer prepares for the next time event by storing TPS(k−2), TPS(k−1), TPS(k), and ATM(k). At step 138 the interrupts are enabled and the program loops back to step 108.

EXAMPLE 4

In certain engine systems it is preferable to take into account past measures of engine speed, RPM(k−f). It has been found that taking past measures of engine speed into account increases the accuracy of the mass airflow estimates during engine idle. To consider past measures of engine speed, the past measurements must be initialized and included in vector U(k), where:

$$U(k) = \begin{pmatrix} TPS(k) \\ TPS(k-1) \\ . \\ . \\ TPS(k-e) \\ RPM(k) \\ RPM(k-1) \\ . \\ . \\ . \\ RPM(k-s) \\ IAC(k) \\ EGR(k) \\ T(k) \\ ATM(k) \\ ATM(k-1) \\ . \\ . \\ ATM(k-g) \end{pmatrix}$$

Additionally, the model parameters include gain factors $c_f \ldots c_{f+s}$ and $d_f \ldots d_{f+s}$, which are included in matrix B and are multiplied by the past measurements of engine speed, RPM(k−f), in the calculation of the model predictions $X^p(k+1)$.

EXAMPLE 5

Many vehicles with IAC valves do not have position feedback of the IAC valve. In such vehicles the IAC valve position command is used as the measure of IAC valve position, IAC(k). If the IAC valve develops a positional bias error, then a consistent error in the predicted and estimated manifold absolute pressures may occur. A method for estimation and correction of IAC valve position bias error is the subject of copending U.S. patent application No. 07/653,923 now U.S. Pat. No. 5,070,846, assigned to the assignee of the present invention. Relevant portions of the method for estimation and correction of IAC valve position bias errors are also set forth here because implementation of the estimation and correction method may significantly improve the functioning of this invention.

While the engine runs in a steady state, the measures of the various engine parameters remain virtually unchanged from one time event to the next. Likewise the vector U(k) remains virtually constant while the engine is in steady state. It can be shown the vectors $X^p(k)$ and $X^e(k)$ also achieve a virtual steady state. In such a steady state condition, if there is an error between the predicted manifold pressure, $MAP^p(k)$, and the actual manifold pressure, MAP(k), it is fairly consistent. Under certain conditions, this error may be attributable to IAC valve positional bias error.

Certain inputs, such as T(k), ATM(k), and RPM(k) are fairly immune to bias error because of the sensor characteristics and/or the sensor information processing in the vehicle control unit. At engine idle, the throttle is in a closed position, so error in throttle position, TPS(k), can be eliminated at idle. If the model parameters, A, B, and C, and the estimator error coefficients, G, are well chosen, they do not cause a consistent error. Once all of the other factors are eliminated, which can be done at idle (a steady state condition), prediction errors can be attributable to IAC valve positional bias error.

The copending patent application mentioned above explains that a quantization of IAC valve position error may be determined as:

$$\delta u^e = (MAP_{ss} - MAP^p_{ss})/\omega_r,$$

where $\delta u^e$ is an estimate of the IAC valve bias error, $MAP_{ss}$ is the steady state value for MAP(k) at engine idle, $MAP^p_{ss}$ is the steady state value for $MAP^p(k)$ at engine idle, and $\omega_r$ is the term in the r'th row (the same row in U(k) in which IAC(k) is in) and the j+1st column of a matrix o, defined below. The matrix, o, is defined by the equation:

$$o = ((I - A(I - GL))^{-1}B,$$

where the superscript "−1" denotes matrix inverse, I is a (j+i+2)×(j+i+2) identity matrix, and L is a matrix L[0 0 ... 0 1 0 ... 0] with the "1" occurring in the j+1st entry. Once $\delta u^e$ is determined, a corrected value for IAC valve position equal to (IAC(k) + $\delta u^e$) can be used in vector U(k) in place of IAC(k) to calculate $X^p(k+1)$, nullifying the positional bias error of the IAC valve.

Figure 4:
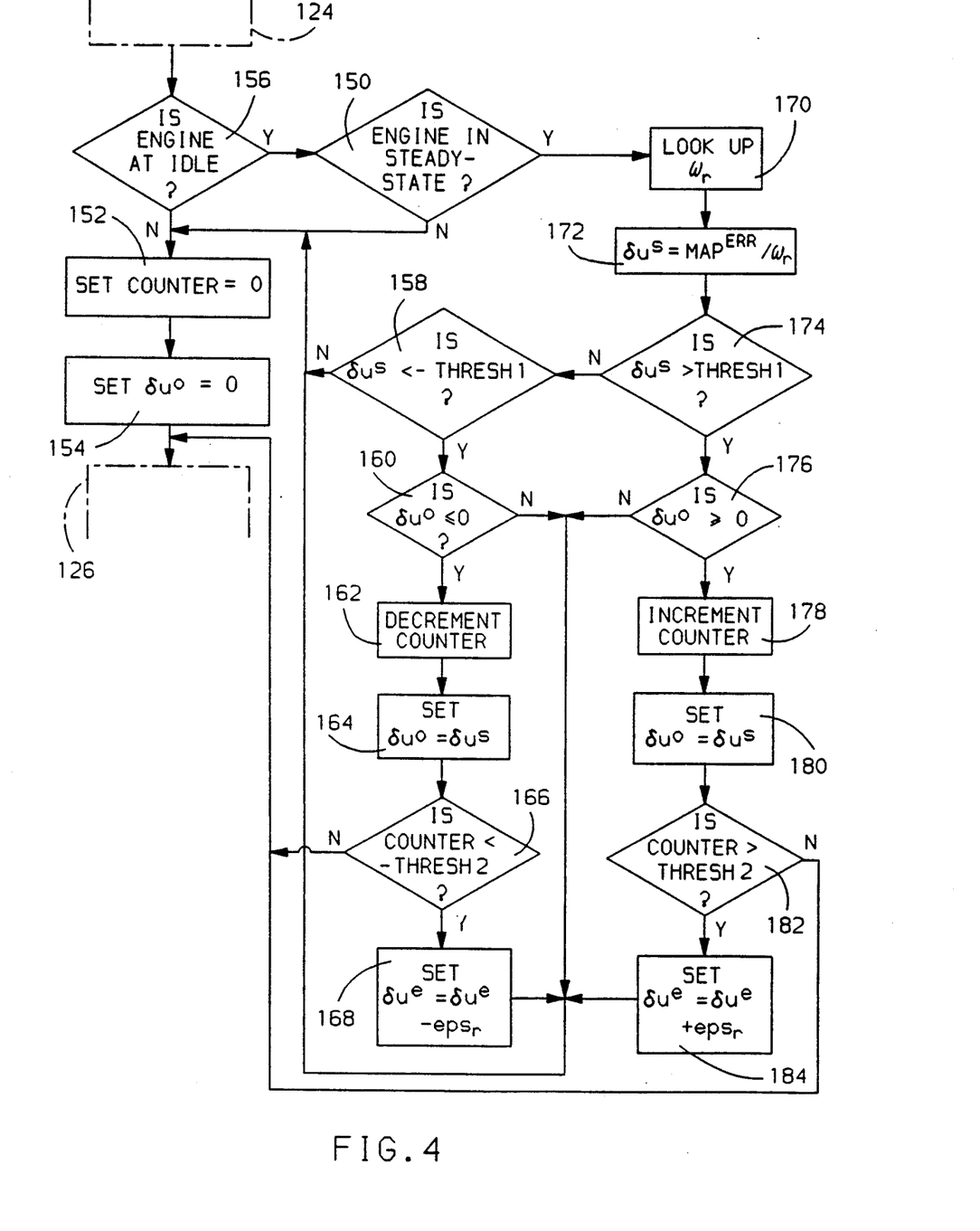
FIG. 4 is a control diagram for a computer implementation of a method for estimating and correcting bias errors in parameter measurements.

FIG. 4 shows the preferred implementation of the method for estimating and correcting bias errors in in the present invention. In the scheme shown, the IAC valve bias error is corrected in small steps, $eps_r$. The decision to take the $eps_r$ step is based on the sign of the bias estimate, $\delta u^e$, the sign of the last bias estimate, and the value of the counter that keeps track of the number of successive times the bias estimates of the same sign exceed a calibrated threshold. This method keeps the value of the sum (IAC(k)+$\delta u^e$) from wildly varying with every iteration of the routine shown.

More particularly, the routine is implemented between blocks 124 and 126 in FIG. 3, but initialization of the variables required for the routine in FIG. 4 occurs at block 104 in FIG. 3. After the scheduling zone is determined in block 124, block 156 tests to see if the engine is at idle. The engine is at idle if the scheduling zone determined at block 124 is the scheduling zone corresponding to engine idle. If the engine is not at idle, the counter is set to zero at block 152, the last bias estimate, $\delta u^o$, is set to zero at block 154, and the computer continues with its routine at block 126 as described above.

If the engine is found to be at idle at block 156, then block 150 tests to see if the engine is in a steady state. The engine may be said to be in steady state if:

$TPS(k) = TPS(k-1) = TPS(k-2) = TPS(k-3),$ $RPM(k) = RPM(k-1) = RPM(k-2) = RPM(k-3),$ and $MAP(k) = MAP(k-1) = MAP(k-2) = MAP(k-3).$ Other steady state tests may be employed. If the engine is not in a steady state, then the program continues to block 152. If the engine is in a steady state, then the program moves to block 170 where a value for $\omega_r$ is determined from a lookup table in computer memory.

A present IAC valve error estimate, $\delta u^s$, is determined at block 172 according to the equation: $\delta u^s = MAP^{err}/\omega_r$. At block 174, the present error estimate is compared to a first threshold (e.g., one increment in IAC valve position command), if the present error estimate is greater than the first threshold then the the routine proceeds to block 176, otherwise to block 158. At block 176, the previous error estimate, $\delta u^o$, is compared to zero. If the previous error estimate is less than zero, then the computer jumps to block 152. If the previous error estimate is greater than or equal to zero, then the counter is incremented at block 178 and the present error estimate becomes the previous error estimate at block 180.

If the counter is not greater than the second threshold (e.g., 8) at block 182, then the computer jumps to block 126. If the counter is greater than the second threshold at block 182, then the IAC error correction value, $\delta u^e$, is updated at block 184 so that $\delta u^e = \delta u^e + eps_r$. The computer then moves to block 152.

If, at block 174, the present error estimate was not greater than the first threshold, then it is compared to a negative of the first threshold at block 158. If the present error estimate is not less than a negative of the first threshold at block 158, then the computer jumps to block 152. If the present error estimate is less than a negative of the first threshold at block 158, then the previous error estimate is compared to zero at block 160. If the previous error estimate is greater than zero at block 160, then the computer jumps to block 152. If the previous error estimate is not greater than zero at block 160, then the computer moves to block 162 where the counter is decremented and to block 164 where the present error estimate becomes the previous error estimate.

At block 166, the counter is compared to a negative of the second threshold. If the counter is not less than a negative of the second threshold at block 166, then the computer jumps to block 126. If the counter is less than a negative of the second threshold at block 166 then block 168 updates the IAC error correction value, $\delta u^e$, such that $\delta u^e = \delta u^e - eps_r$ and then continues to block 152.

When an error estimation routine such as the routine in FIG. 4 is implemented with this invention, the computation of MAP$^p$(k+1) and MAF$^p$(k+1) at blocks 132 and 134 uses values equal to the sum (IAC(k)+δu$^e$) in place of IAC(k) to achieve higher accuracy in the prediction of mass airflow into the engine.

The subject invention is not limited to the above described examples but encompasses the use of model-based prediction and error-based correction to accurately determine the mass airflow into an automobile engine in response to measured engine parameters. Various improvements and modifications to the present invention may occur to those skilled in the art and fall within the scope of the invention as set forth below.

The embodiments of the invention in which an exclusive property or privilege is claimed are defined as follows:

1. A method of controlling a motor vehicle engine comprising the steps of, iteratively:
   (a) measuring a plurality motor vehicle engine parameters;
   (b) scheduling, from a plurality of sets of model parameters, a select set of model parameters in response to at least one of the measured motor vehicle engine parameters;
   (c) scheduling, from a plurality of sets of correction coefficients, a select set of correction coefficients in response to at least one of the measured motor vehicle engine parameters;
   (d) predicting, (i) in response to the measured motor vehicle engine parameters and (ii) in response to the select set of model parameters, a prediction value of manifold pressure and a prediction value of mass air flow into the engine;
   (e) estimating, in response to (i) the measured motor vehicle engine parameters, (ii) the prediction values of manifold pressure and mass air flow, and (iii) the select set of correction coefficients, an estimation value of manifold pressure and an estimation value of mass air flow; and
   (f) controlling a fuel delivery into the motor vehicle engine in response to the estimation value of mass airflow.

2. A method of controlling a motor vehicle engine comprising the steps of:
   (a) retrieving from a memory an initialization set comprising a prediction value of manifold pressure and a prediction value of mass air flow and thereafter iteratively;
   (b) measuring a plurality of motor vehicle engine parameters, wherein manifold pressure is a measured motor vehicle engine parameter;
   (c) selecting, from a plurality of sets of correction coefficients, a select set of correction coefficients responsive to at lease one of the measured motor vehicle engine parameters;
   (d) estimating, in response to (i) the measured motor vehicle engine parameters, (ii) the select set of correction coefficients and (iii) the prediction values of mass air flow and manifold pressure, an estimation value of manifold pressure and an estimation value of mass air flow, wherein mass air flow is an unmeasured motor vehicle engine parameter;
   (e) retrieving, from a plurality of sets of model parameters, a select set of model parameters responsive to at least one of the measured motor vehicle engine parameters; and
   (f) predicting, in response to (i) the estimation values of manifold pressure and mass airflow, the (ii) plurality of measured motor vehicle engine parameters, and (iii) the select set of model parameters, a new prediction value of manifold pressure and a new prediction value of mass air flow;
   (g) controlling the motor vehicle engine in response to the new prediction value of mass airflow.

3. The method of claim 2, wherein the plurality of sets of correction coefficients are determined through statistical optimization.

4. The method of claim 2 wherein the model parameters are found through statistical regression from at least one test engine.

5. A method for controlling an engine, comprising the steps of:
   (a) measuring a plurality of engine parameters at a present state of the engine;
   (b) scheduling, from a plurality of sets of correction coefficients stored in a memory, a select set of correction coefficients responsive to at least two of the measured engine parameters;
   (c) estimating, responsive to the select set of correction coefficients and the measured engine parameters, a first estimated value of a first engine parameter at the present state of the engine and a second estimated value of a second engine parameter at the present state of the engine, wherein the first engine parameter is a measured parameter and the second engine parameter is an unmeasured parameter;
   (d) scheduling, from a plurality of sets of prediction parameters stored in the memory, a select set of prediction parameters responsive to at least two of the measured engine parameters;
   (e) predicting, responsive to (i) the select set of prediction parameters (ii) the first and second estimated values and (iii) the measured engine parameters, a first predicted value of the first engine parameter and a second predicted value of the second engine parameter at one of (i) the present state of the engine and (ii) a future state of the engine, wherein
   said estimating step including estimating the second parameter is responsive to a difference between the measured value of the first engine parameter and the first predicted value of the first engine parameter; and
   (f) controlling the engine responsive to at least one member of a set comprising: (i) the second prediction value and (ii) the second estimation value.

6. An apparatus comprising:
   a motor vehicle engine;
   an intake manifold having a manifold pressure;
   a throttle having a position responsive to an accelerator pedal;
   a microprocessor control unit, wherein the microprocessor control unit comprises (a) means for receiving measurements of a plurality of motor vehicle engine parameters at a present state of the engine, (b) means for scheduling, from a plurality of sets of correction coefficients stored in a memory, a select set of correction coefficients responsive to at least two of the measured motor vehicle engine parameters, (c) means for estimating, responsive to the select set of correction coefficients and the measured motor vehicle engine parameters, a first estimated value of a first engine parameter and a second estimated value of a second engine parameter at the present state of the engine, wherein the first engine parameter is a measured motor vehicle engine parameter and the second engine parameter is an unmeasured motor vehicle engine parameter, (d) means for scheduling, from a plurality of sets of prediction parameters stored in the memory, a select set of prediction parameters responsive to at least two of the plurality of engine parameters, (e) means for predicting, responsive to (i) the select set of prediction parameters, (ii) the first and second estimated values and (iii) the measured motor vehicle engine parameters, a first predicted value of the first engine parameter and a second predicted value of the second engine parameter at one member of a first set comprising: (i) the present state of the engine and (ii) a future state of the engine, wherein said estimating step including estimating the second parameter is responsive to a difference between the measured value of the first engine parameter and the first predicted value of the first engine parameter, and (f) controlling the means for delivering fuel to the engine to control air/fuel ratio into the engine responsive to at least one member of a second set comprising: (i) the second prediction value and (ii) the second estimation value.

* * * * *